United States Patent
Haimer

(10) Patent No.: US 8,276,896 B2
(45) Date of Patent: Oct. 2, 2012

(54) POSITIONING DEVICE FOR CUTTING TOOLS IN TOOL CASES

(75) Inventor: Franz Haimer, Igenhausen (DE)

(73) Assignee: Haimer GmbH (DE)

( * ) Notice: Subject to any disclaimer, the term of this patent is extended or adjusted under 35 U.S.C. 154(b) by 1140 days.

(21) Appl. No.: 11/996,952

(22) PCT Filed: Jul. 27, 2006

(86) PCT No.: PCT/EP2006/007462
§ 371 (c)(1),
(2), (4) Date: Jun. 6, 2008

(87) PCT Pub. No.: WO2007/012492
PCT Pub. Date: Feb. 1, 2007

(65) Prior Publication Data
US 2009/0214303 A1    Aug. 27, 2009

(30) Foreign Application Priority Data
Jul. 27, 2005   (DE) ............... 20 2005 011 793 U

(51) Int. Cl.
*B23Q 16/02* (2006.01)
(52) U.S. Cl. ........................... 269/63; 269/71
(58) Field of Classification Search .............. 269/63, 269/58, 60, 71, 95, 291
See application file for complete search history.

(56) References Cited

U.S. PATENT DOCUMENTS

| | | | |
|---|---|---|---|
| 3,238,630 A | | 3/1966 | Jeanneret |
| 6,003,851 A * | | 12/1999 | Araki et al. .............. 269/239 |
| 6,308,944 B1 * | | 10/2001 | Ota et al. ................ 269/97 |
| 6,409,162 B1 * | | 6/2002 | Belusko ................... 269/71 |
| 6,712,348 B1 * | | 3/2004 | Kramarczyk et al. ....... 269/329 |
| 7,044,462 B2 * | | 5/2006 | Iwata ..................... 269/309 |
| 7,819,392 B2 * | | 10/2010 | Kuroda et al. ............ 269/309 |
| 7,900,898 B2 * | | 3/2011 | Wampler, II .............. 269/152 |
| 2004/0080089 A1 | | 4/2004 | Haimer et al. |
| 2005/0152758 A1 | | 7/2005 | Elman et al. |
| 2006/0078396 A1 | | 4/2006 | Buttau et al. |
| 2009/0214303 A1 * | | 8/2009 | Haimer .................... 407/36 |

FOREIGN PATENT DOCUMENTS

| | | |
|---|---|---|
| DE | 1477457 | 3/1969 |
| DE | 1602840 | 4/1970 |
| DE | 10025008 | 11/2001 |
| DE | 20203783 | 7/2003 |
| DE | 10225839 | 12/2003 |
| DE | 10349245 | 7/2004 |
| DE | 10317574 | 10/2004 |
| JP | 2001-511715 | 8/2001 |
| JP | 2004-142006 | 5/2004 |
| JP | 2004-232631 | 8/2004 |
| WO | WO 99/12699 | 3/1999 |

OTHER PUBLICATIONS

International Search Report (including translation) for International (PCT) Patent Application No. PCT/EP2006/007462, mailed Oct. 19, 2006.
Written Opinion for International (PCT) Patent Application No. PCT/EP2006/007462.
International Preliminary Report on Patentability for International (PCT) Patent Application No. PCT/EP2006/007462, issued Jan. 29, 2008.

* cited by examiner

*Primary Examiner* — Lee D Wilson
(74) *Attorney, Agent, or Firm* — Sheridan Ross PC

(57) ABSTRACT

A positioning device for chip removing tools includes a tool holder receiver aligned with a positioning mechanism such as an engagement or index groove. A tool holder is aligned with the tool holder receiver at an angular position. A tool is aligned with the tool holder at another angular position.

15 Claims, 3 Drawing Sheets

POSITIONING DEVICE FOR CUTTING TOOLS IN TOOL CASES

CROSS REFERENCE TO RELATED APPLICATION

Figure 1:
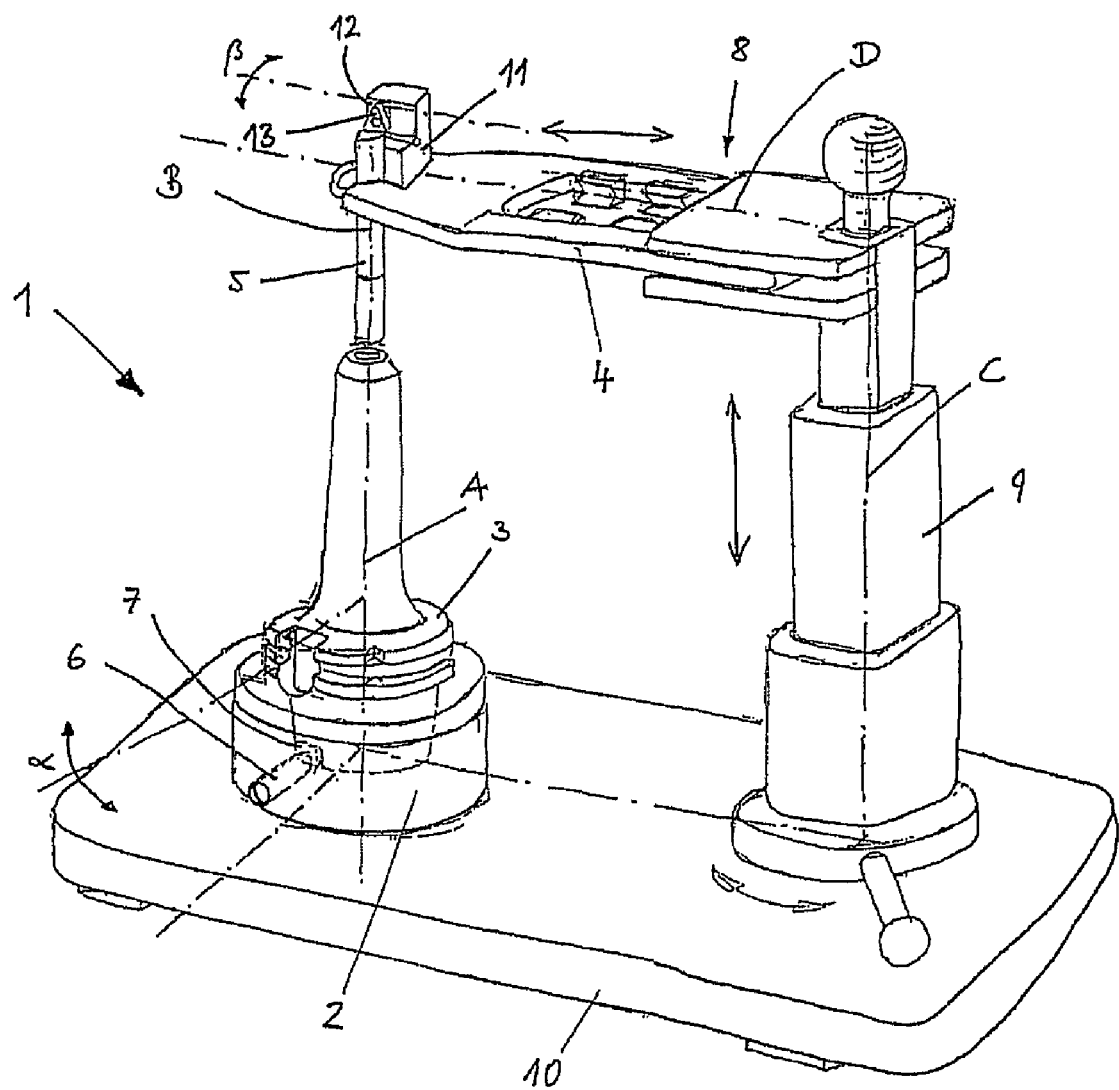

This application is a national stage application under 35 U.S.C. 371 of PCT Application No. PCT/EP2006/007462 having an international filing date of Jul. 27, 2006, which designated the United States, which PCT application claimed the benefit of German Application No. 20 2005 011 793.5 filed Jul. 27, 2005, the entire disclosure of each of which is hereby incorporated herein by reference.

The present invention relates to a positioning device for chip removing tools in tool holders according to the preamble of patent claim 1.

In chip removing machines like lathes and milling machines, or similar the chip removing tool is received in a tool holder. In particular in turning tools which are not provided rotation cylindrical due to cutting edges operating on the right side, or on the left side, the position of the lathe tool and thus of the cutting edge has to be exactly adjusted to the work piece in order to assure a precise and defined machining of the work piece. State of the art tool holders comprise an engagement- or index groove, whereby the position of the tool holder is determined in the lathe, or in the milling machine. For this reason the positioning of the tool with respect to the work piece can mostly not be performed by means the holder but has to be preformed when fitting the tool in the tool holder itself.

A known positioning means for the cutting edge of a turning tool in a tool holder is comprised of a receiver in which the tool holder is fixated and a movable measuring unit, which can be brought into contact with the cutting edge of the turning tool inserted into the tool holder. The feeler of the measuring unit, which is in contact with the cutting edge, thus directly shows the angular position of the cutting edge with reference to the longitudinal position of the tool holder. After the desired angular position of the cutting edge has been determined, the tool holder is locked e.g. by means of a clamping lever, and thus the turning tool is fixated in the tool holder.

The disadvantage of this known positioning device is that the angular position of the cutting edge is adjusted through manual rotation of the turning tool in the tool holder, wherein this is preformed depending on the motoric sensitivity of the adjusting person, and the adjustment of the angular position in the tool holder is preformed while it is open. However, in this open state of the tool holder it comprises a larger opening diameter, than in the closed state, therefore, when the tool holder is in a horizontal position, the tool is raised during the closing process and mostly also rotated by a certain angle. An exact positioning is thus not possible with this known positioning device, or only possible with great difficulty. Another disadvantage of this known positioning device is that it is not suitable for shrink tool holders, since the heating of the shrink tool holder and thus opening the tool holder may only be performed over a very short period of time, which is mostly not sufficient to perform an exact positioning of the tool with respect to the holder.

Here the present invention comes to play, which has the object to provide a positioning device, as described above, which allow a more simple and exact positioning of a tool in a tool holder and which is also suitable in particular for shrink tool holders.

This object is accomplished through a positioning device according to claim 1. Preferred and advantageous refinements of this positioning device are objects of the dependent claims.

In addition to a tool holder receiver, in which positioning means are provided, which determine the angular position of the tool holder with respect to the receiver, the claimed invention comprises a tool receiver, in which the tool, (e.g. the cutting edge of a turning tool) can be fixated in a certain angular position with reference to the tool receiver. Thus the tool holder receiver aligns the tool holder with its longitudinal axis along a certain axis and the tool receiver aligns the tool with its longitudinal axis along another predetermined axis. It is furthermore provided that the tool holder receiver and the tool receiver are disposed relative to each other, so that during insertion of the tool into the tool receiver the alignment axes of tool holder and tool are identical and the angular positions of tool and tool receiver are fixated relative to each other.

The present positioning device is characterized in that the tool can be exactly positioned in the tool receiver in a defined angular position and upon insertion of the tool into the tool holder the angular positions of tool holder and tool are fixated in a defined manner. The positioning of the tool is not performed directly in the tool holder, but already before in the tool receiver. The present positioning device is thus also suitable in particular for shrink tool holders, since the alignment of the tool in the tool receiver can be performed with all the required diligence, which can also take a longer amount of time, while the insertion of the tool into the tool holder can be performed very quickly. On the other hand it is assured by the present positioning device that during insertion of the tool into the tool holder their longitudinal axes are identical, thus both components are disposed concentric to each other. This way a possible change of the position of the tool in the tool holder during the locking process in collet tool holders and clamping tool holders is minimized, and completely eliminated in shrink tool holders. Overall the positioning of a tool in a tool holder can be performed in a much simpler and more exact manner with the present positioning device and in particular is less dependent on the motoric capabilities of the operators.

In an advantageous embodiment the tool receiver is disposed at a support, whose longitudinal axis is parallel to the longitudinal axes of the tool holder and the tool, and wherein the tool receiver is movable along the support, this means in the direction of the support. It can be furthermore provided that either the tool receiver is disposed pivotable around the longitudinal axis of the support, or the support itself in rotatable around its longitudinal axis. This way the tool can be pivoted from a position, in which the longitudinal axis of the tool and of the work piece are not identical, thus coincident, into a position, in which these axes are identical. Alternatively, or simultaneously, the tool receiver can be movable with respect to the support, so that the distance of the longitudinal axis of the tool can be varied with reference to the longitudinal axis of the support, and thus the tool can be moved from a position, in which the longitudinal axes of tool and work piece are not identical, into a position, in which these axes are identical. Through pivoting or moving the tool receiver with reference to the support, the insertion of the tool into a shrink holder can be configured particularly user friendly, since the tool receiver is not disposed in a disturbing manner close to the tool holder during heating or cooling of the tool holder.

As another alternative, also the support itself can be movable with reference to the tool holder receiver, or the tool holder receiver can be movable with reference to the support, so that the distance of the longitudinal axes between support and tool holder can be varied. Thereby also an adjustment of the positioning device to different tool receivers, which can typically range from 3 mm to 100 mm can be performed.

In a particularly simple manner the tool can be positioned in the tool receiver, when at least one stop element is provided at the tool receiver, which provides at least one stop for the tool, wherein this stop predetermines or defines the angular position of the tool with reference to the tool receiver. In this case the tool, e.g. the cutting edge of a turning tool is brought into contact with the stop, whereby the angular position is directly adjusted with the stop position predetermined. If the stop is provided to measure the angular positioning of the tool, this can be performed in a simple manner through a contact with the stop. In an advantageous manner the stop element thus comprises stops for right- or left facing tools, e.g. for turning tools with right- or left facing cutting edges, wherein a left facing cutting edge means an orientation, in which the work piece, which is being machined at one exterior circumference, is turned clockwise past the turning tool. Depending on the orientation of the tool, one of the respective stops can then be brought in contact with the tool. This way the positioning device is universally usable for all possible tools and can be quickly adapted to a tool.

In an advantageous and very precise manner the angular position of the tool can be predetermined through the stop by means of a micrometer screw, or by means of a dial indicator. Thus, the micrometer screw, or the dial indicator themselves can directly from the stop, or the micrometer screw acts upon the stop element, or the dial indicator determines the deflection of the stop element.

In order to be able to quickly and safely calibrate the stops, one or several calibration elements can be provided, by means of which the stops can be brought into contact. It is useful in particular in this context, when a particular index element is provided for right- and left facing tools. An adaptation of the positioning to different tool diameters and e.g. to positions and geometries of the cutting edges of turning tools is performed in a simple manner by the stop element being disposed movable on the tool receiver with reference to the tool.

Figure 2:
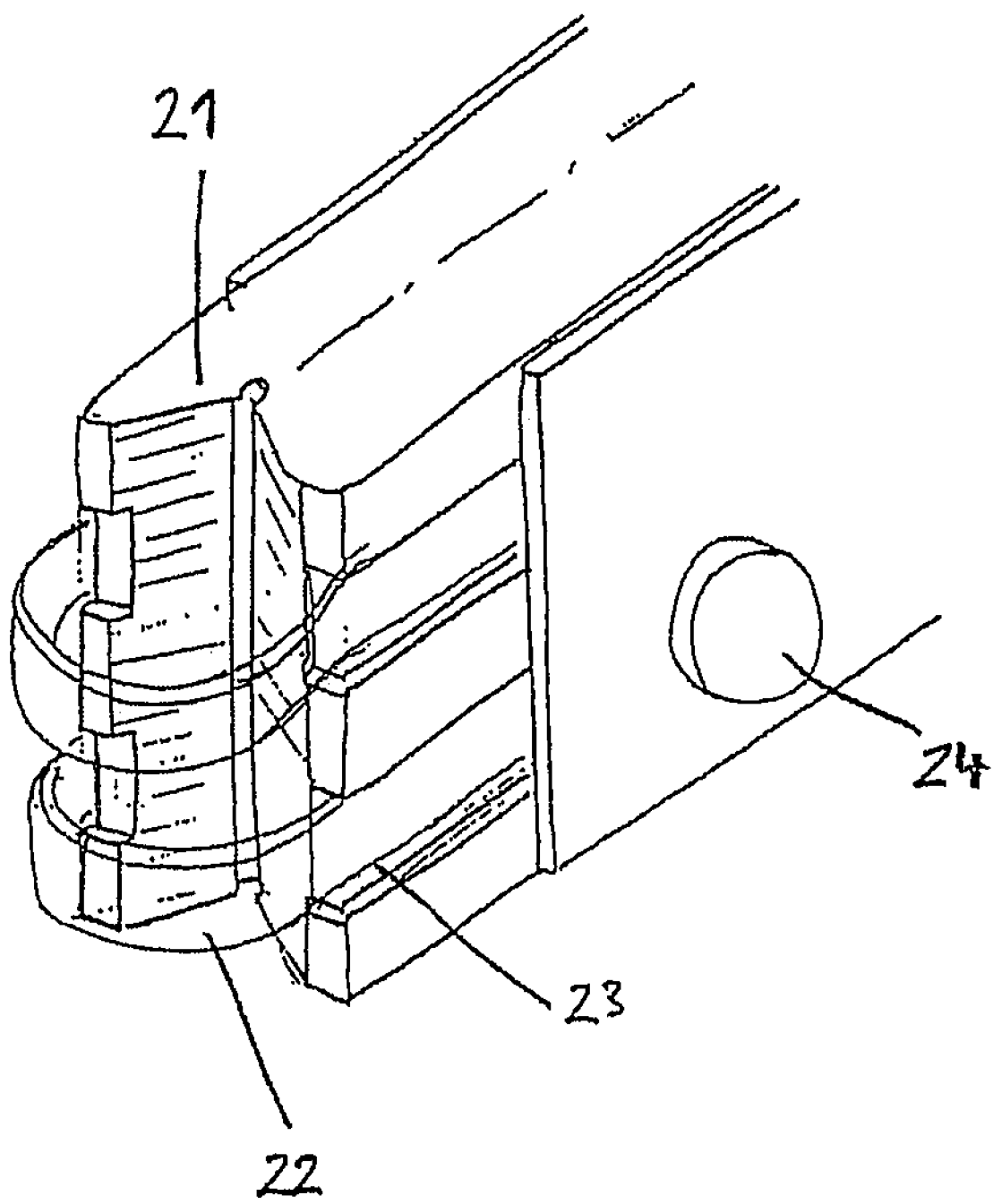

Advantageous refinements, characteristics and features of the present invention become evident from the subsequent description in conjunction with preferred embodiments. It is shown in:

FIG. 1 A preferred embodiment of the present positioning device;

FIG. 2 A detail of the tool receiver; and

Figure 3:
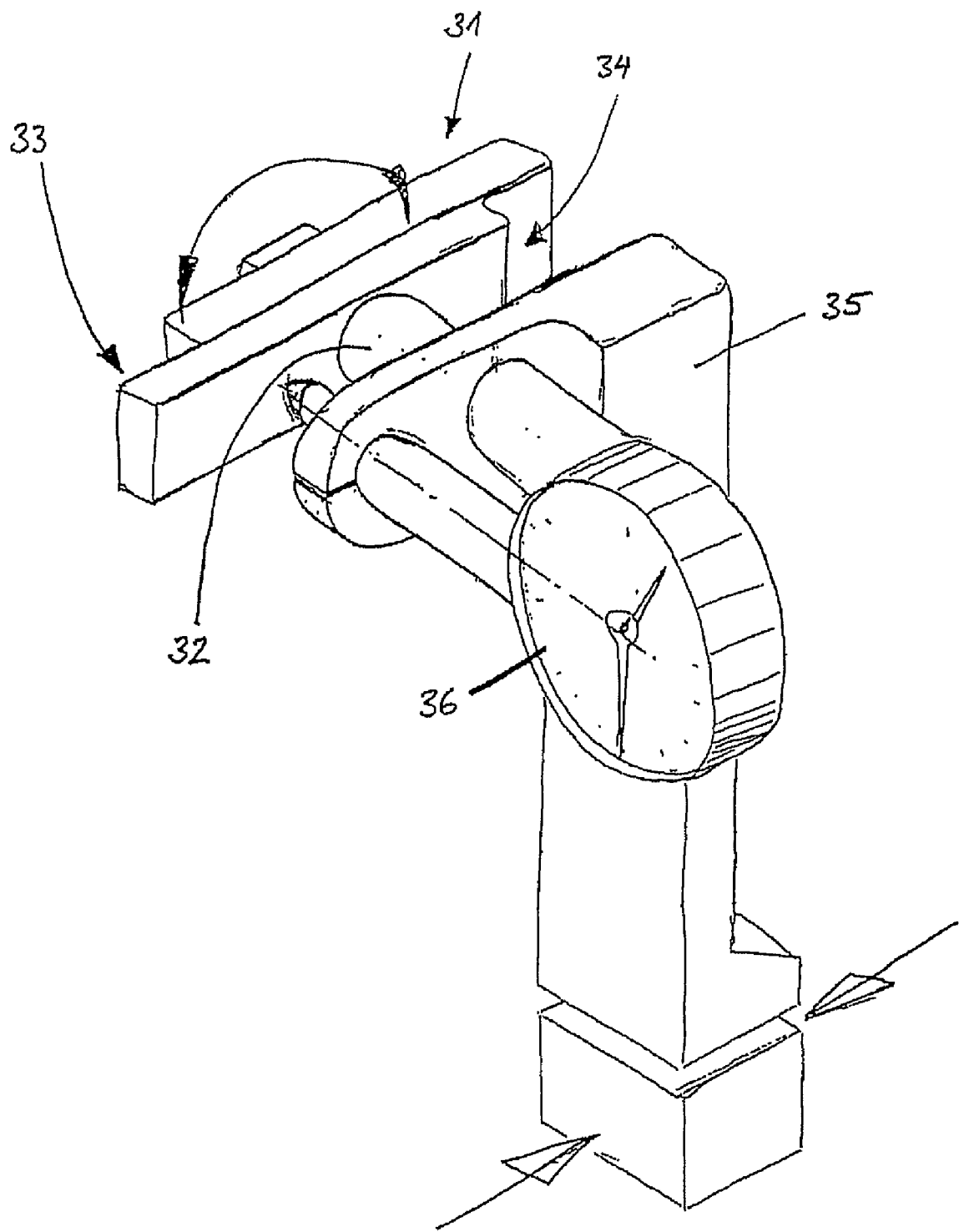

FIG. 3 An alternative embodiment of the stop element of the tool receiver.

FIG. 1 shows a preferred embodiment of the present positioning device 1 in a purely schematic perspective. The positioning device is comprised of a tool holder receiver 2, in which the tool holder 3 is received, and a tool receiver 4, in which the tool 5 is received. The tool holder receiver 2 comprises a positioning means 6, e.g. a pin, which engages the positioning means of the tool holder, in the present case an engagement, or indexing groove 7, and thus determines the angular position $\alpha$ of the tool holder 3, which is aligned with its longitudinal axis along the axis A with reference to the tool holder receiver 2. The tool receiver 4 is connected through a suitable pull out device 8 with a column 9, whose longitudinal axis aligned along the axis C. The tool holder receiver 2 and the column 9 are mounted to a base plate 10, so that the axes A and C are disposed parallel to each other. The tool receiver 4 is connected to the column 9 through the pull out device 8, so that the longitudinal axis of the tool receiver D is disposed perpendicular to the axis C. The tool 5 is mounted in the tool receiver 4, so that the axis B is disposed parallel to the axis C and to the axis A, and consequently disposed perpendicular to the axis D.

In FIG. 2 an embodiment of a head of a tool receiver 4 is shown in an exemplary manner, which comprises a prism 21 with clamping bands 22, which extend into respective grooves 23 of the prism 21, and can be brought into contact with a clamping button 24 after inserting a tool 5 therein. Thereby the tool 5 is fixated between the prism 21 and the clamping bands 22. Before closing the clamping bands 22 an alignment of the tool 5 is performed, so that the cutting edge 13 of the turning tool 5 is aligned with a stop element 11 comprising a stop 12. Thereby the angular position $\beta$ of the tool 5 is predetermined with reference to the tool receiver 4.

With this positioning device 1 and exact positioning of the tool 5 in the tool holder 3 can now be performed in a simple manner. When this is a shrink tool holder 3, as in the embodiment illustrated in FIG. 1, the tool 5 is brought into contact with the stop 12 of the stop element 11 in a first step with its cutting edge 13 in the tool receiver 4 and fixated by means of the clamping bands 22. Subsequently the column 9, which is rotatably mounted on the base plate 10, is rotated so far that the tool 5 is pivoted out of the range of the tool holder 3. Now, by means of a suitable heating apparatus (not shown), e.g. an induction coil, the head piece of the tool holder 3, into which the tool 5 is inserted, is heated. At a temperature of 300° C. to 380° C. the head of the clamping holder 3 is expanded so far that the tool 5, which typically comprises and exterior diameter which is larger by 500 µm, than the interior diameter of the receiver of the clamping holder 3, can be inserted. For this purpose, after removing the heating device, the column 9 is rotated so far around the axis C until the tool 5 is exactly disposed over the receiver of the tool holder 3, this means the axes A and B are identical. The tool receiver 4 is now lowered by lowering of the telescoping column 5 and thus the tool 5 is inserted into the clamping holder 3. After reaching the base of the receiver of the clamping holder 3, or a predetermined position, which can be marked by means of suitable means, the tool 5 with the tool receiver 4 is held in this position until the shrinking holder 3 is shrunk onto the tool 5 through cooling. Now the tool 5 is disengaged from the tool receiver 4, and said tool receiver is raised upward through extending the telescoping column 9, and then removed from the area of the tool holder 3 and the tool 5 through the rotation of the column 9, so that the tool holder 3 can be removed from the tool holder receiver 2 after additional cooling by means of insert able cooling elements (not shown).

Through the geometry of the positioning device 1, this means the disposition of the axes A, B, C and D relative to each other, and the defined predetermination of the angular position $\alpha$ of the tool holder 3 in the tool holder receiver 2 and the angular position $\beta$ of the cutting edge 13 of the tool 5 by the stop 12 with reference to the tool receiver 4, an exact and reproducible positioning of the tool 5 is accomplished in the tool holder 3 is accomplished.

Opposite to the embodiment illustrated in FIG. 1, in which the tool receiver 4 is mounted to the column 9 by means of a pull out device 8, it can also be provided that the column 9 itself, and/or the tool holder receiver 2 are moveable towards each other relative to the base plate 10. Furthermore a support can be provided instead of the telescoping column 9 illustrated in FIG. 1, wherein the tool holder 4 is disposed directly elevation adjustable at the tool receiver 4.

It is evident that the pivoting of the tool receiver 4 relative to the column 9, or a rotation of the column 9 around the axis C is mostly used in order to facilitate free access to the tool holder 3, in particular during mounting in the tool holder receiver 2, and during heating and cooling a shrink holder 3. This free axis, however, can also be facilitated in that the column 9 is provided long enough, so that the tool receiver 4 is removed far enough in vertical direction from the tool holder 3, or the column 9 and/or the tool holder receiver 2 are received in the base plate 10 in a movable manner, so that the tool receiver 4 and the tool holder 3 can be sufficiently removed from each other in horizontal direction.

For reasons of exact adjustability, and thus also reproducibility, it is preferred that all guides, thus all sliding and rotating guides of the positioning device 1 are guides without clearance, in particular preloaded ball bearing or roller bearing guides.

In order to adapt the tool receiver 4 to different tool sizes and shapes it advantageous, when the stop element 11 is disposed moveable on the tool receiver 4. An advantageous embodiment of the stop element 31 is shown in FIG. 3. Thus the stop element 31 is supported in a movable manner on a shaft 32 and comprises a stop 33 for left facing cutting edges and a stop 34 for right facing cutting edges of turning tools. Depending on a right- or a left facing cutting tool 5 being clamped into the tool holder 3, the stops 34 or 33 are pivoted in and brought into contact with the cutting edge 13 of the tool 5.

The shaft 32 is received in an out rigger 35, which is disposed moveable on the tool receiver 4 as indicated by the arrows. At the out rigger 35 also a dial indicator 36 is disposed, which determines the deflection of the stop element 31. Instead of the dial indicator 36 also a micrometer screw can be provided in order to adjust desired cutting edge positions correctly, and e.g. to adjust such a desired position e.g. when receiving the tool 5 in a clamping holder, so that the rotation of the tool is compensated, which occurs during clamping of the clamping holder due to the clamping movement in the interior of the holder. On the other hand, by means of such a micrometer screw, a deviating orientation of the cutting edge can also be adjusted intentionally, relative to the tool holder 3, so that the cutting edge is not moved towards the turned work piece in a radial manner during turning in the lathe, thus the cutting edge does not impact the surface of the work piece in tangential direction, but has a different effect.

Calibration means are not shown in FIG. 3, e.g. calibration rods for the stops 33 and 34 in order to perform the calibration of the dial indicator 36. Though all transalatoric and rotation movements are performed manually in the embodiments illustrated here, it can also be provided that e.g. precisely running linear motors are provided in order to automate the positioning processes. Furthermore it can be an advantageous when the tool holder receiver 2 can be replaced, in order to be able to provide tool holders with different interfaces towards the spindle, with a tool 5, by means of the positioning device 1. It is also advantageous in this context, when the tool holder receiver 2 is rotatable with respect to the base plate 10, in particular in certain predetermined angular degrees. This way the positioning of the tool 5 can be changed very quickly in an uncomplicated manner relative to the tool holder 3, without the position of the stop 12 with reference to the tool 5 and the tool receiver 4 having to be changed.

What is claimed is:

1. A positioning device for chip removing tools, comprising a tool holder having a first positioning means, the first positioning means being in the form of at least one of an engagement and index groove, wherein a tool holder receiver has a second positioning means, such that engagement of the first and second positioning means predetermines a first angular position of the tool holder with reference to the tool holder receiver, wherein the tool holder is aligned in the tool holder receiver with a common longitudinal axis of the tool holder and tool holder receiver being along a first axis, wherein a tool receiver fixes a tool in a second annular position with respect to the tool receiver, wherein the tool is aligned with a longitudinal axis of the tool being along a second axis and the tool receiver is moveable with respect to the tool holder receiver, so that the tool is insertable into the tool holder, wherein, when inserting the tool into the tool holder, the tool holder receiver and the tool receiver are disposed relative to each other so that the first axis and the second axis are aligned and the second annular position is defined with reference to the first angular position, wherein the tool receiver is disposed at a column, the column being aligned along a third axis, wherein the tool receiver is moveable along the column, and wherein the column is rotatable around a longitudinal axis of the column.

2. A positioning device according to claim 1, wherein the first axis, the second axis, and the third axis are parallel to each other.

3. A positioning device according to claim 1, wherein the tool receiver is disposed at the column pivotable around the third axis, and thus the tool is pivotable from a position, in which the first axis and the second axis are not identical, into a position, in which the first axis and the second axis are identical.

4. A positioning device according to claim 1, wherein the tool receiver is movable with reference to the column, so that the distance of the second axis and the third axis can be varied, and thus the tool can be moved from a position, in which the first axis and second axis are not identical, into a second position, in which the first axis and the second axis are identical.

5. A positioning device according to claim 1, wherein the column is moveable with reference to the tool holder receiver, or the tool holder receiver is moveable with reference to the column, so that the distance of the first axis and the third axis is variable and thus the tool is moveable from a position, in which the first axis and the second axis are not identical, into a second position, in which the first axis and the second axis are identical.

6. A positioning device according to claim 1, wherein at the tool receiver at least one stop element is provided, the at least one stop element provides at least one stop for the tool, the at least one stop determines or defines the second angular position of the tool with reference to the tool receiver.

7. A positioning device according to claim 6, wherein the stop element comprises stops for right and left facing tools, and one of these stops for the right and left facing tools respectively can be brought into contact with the tool.

8. A positioning device according to claim 6, wherein the second angular position is predetermined by the at least one stop by means of a micrometer screw.

9. A positioning device according to claim 6, wherein the second angular position is determined by the at least one stop by means of a dial indicator.

10. A positioning device according to claim 6, wherein calibration elements are provided, which can be brought into contact with at least one the stop in order to calibrate a position of the at least one stop with reference to the tool receiver.

11. A positioning device according to claim 6, wherein the at least one stop element is moveably disposed on the tool receiver with reference to the tool.

12. A positioning device according to claim 1, wherein the tool is mounted in the tool receiver by means of at least one clamping band, a clamping bar with fixation screw, a magnet, or other mounting means.

13. A positioning device according to claim 1, wherein the tool holder receiver is rotatably mounted on a base plate.

14. A positioning device according to claim 1, wherein the tool holder receiver can be adapted to various tool holders, or can be replaced.

15. A positioning device according to claim 1, wherein the positioning device is provided as a fixed component, or as replaceable auxiliary equipment of a shrinking device or of a preadjustment device.

* * * * *